United States Patent
Hughes

(10) Patent No.: US 12,043,543 B2
(45) Date of Patent: Jul. 23, 2024

(54) CUSTOM OPTICALLY ACTIVE QUANTUM-PARTICLE CELL MANUFACTURE

(71) Applicant: ColdQuanta, Inc., Boulder, CO (US)

(72) Inventor: Steven Michael Hughes, Louisville, CO (US)

(73) Assignee: ColdQuanta, Inc., Boulder, CO (US)

( * ) Notice: Subject to any disclaimer, the term of this patent is extended or adjusted under 35 U.S.C. 154(b) by 52 days.

(21) Appl. No.: 17/874,149

(22) Filed: Jul. 26, 2022

(65) Prior Publication Data

US 2023/0365404 A1   Nov. 16, 2023

Related U.S. Application Data

(60) Provisional application No. 63/230,075, filed on Aug. 6, 2021.

(51) Int. Cl.
*B82B 3/00* (2006.01)
*B82Y 30/00* (2011.01)
*B82Y 40/00* (2011.01)
*G02B 1/00* (2006.01)

(52) U.S. Cl.
CPC ............ *B82B 3/0014* (2013.01); *B82Y 30/00* (2013.01); *B82Y 40/00* (2013.01); *G02B 1/002* (2013.01)

(58) Field of Classification Search
CPC ....... B82B 3/0014; B82Y 30/00; B82Y 40/00; G02B 1/002
See application file for complete search history.

(56) References Cited

U.S. PATENT DOCUMENTS

| | | | | |
|---|---|---|---|---|
| 7,126,112 | B2* | 10/2006 | Anderson | G21K 1/006 250/251 |
| 7,470,971 | B2* | 12/2008 | McBride | C03C 27/00 257/773 |
| 9,960,025 | B1* | 5/2018 | Hughes | F04B 37/14 |
| 9,960,026 | B1* | 5/2018 | Hughes | H01J 41/14 |
| 10,358,343 | B2* | 7/2019 | Cho | H03H 9/24 |
| 10,992,325 | B2* | 4/2021 | Urzhumov | H04B 1/0458 |
| 11,650,403 | B2* | 5/2023 | Sharma | H01S 5/026 359/708 |

(Continued)

OTHER PUBLICATIONS

Chen et al., 2018, A Broadband Achromatic Metalens for Focusing and Imaging in the Visible, Nature Nanotechnology 13 (3) (Jan. 1), pp. 220-226.

*Primary Examiner* — David A Vanore
(74) *Attorney, Agent, or Firm* — Van Pelt, Yi & James LLP; Clifton Leon Anderson

(57) ABSTRACT

A process for manufacturing custom optically active quantum-particle cells includes forming a pre-customization assembly and then, in response to receipt of specifications for quantum-particle cells, performing a customization sub-process on the pre-customization assembly to yield custom quantum-particle cells, e.g., vapor cells, vacuum cells, micro-channel cells containing alkali metal or alkaline-earth metal ions or neutral atoms. The customization can include forming metasurface structures on cell walls, e.g., to serve as anti-reflection coatings, lenses, etc., and introducing quantum particles (e.g., alkali metal atoms). A cover can be bonded to hermetically seal the assembly, which can then be diced to yield plural separated custom optically active quantum-particle cells.

4 Claims, 6 Drawing Sheets

(56) References Cited

U.S. PATENT DOCUMENTS

| | | | |
|---|---|---|---|
| 11,808,961 B2* | 11/2023 | Ding | G02B 5/208 |
| 2020/0259307 A1* | 8/2020 | Sharma | H01S 5/3432 |
| 2021/0296021 A1* | 9/2021 | Anderson | H04L 67/14 |
| 2021/0410266 A1* | 12/2021 | Saffman | H05H 3/04 |
| 2022/0237497 A1* | 7/2022 | Anderson | G06N 10/80 |
| 2022/0237613 A1* | 7/2022 | Anderson | G06Q 20/401 |
| 2022/0252761 A1* | 8/2022 | Xia | G02B 1/002 |
| 2022/0262929 A1* | 8/2022 | Hughes | H01L 29/66977 |
| 2023/0070293 A1* | 3/2023 | Oh | G02B 1/002 |
| 2023/0259803 A1* | 8/2023 | Anderson | G06N 10/20 250/251 |
| 2023/0260670 A1* | 8/2023 | Hughes | B33Y 40/20 250/251 |

* cited by examiner

Receive Custom Specifications for Plural Products 220

Customization Subprocess 230

Metasurfaces 118

Metasurfaces 116

Sealed Assembly 402

Metasurfaces 118

Metasurfaces 116

Completed Cells 150

CUSTOM OPTICALLY ACTIVE QUANTUM-PARTICLE CELL MANUFACTURE

CROSS REFERENCE TO OTHER APPLICATIONS

This application claims priority to U.S. Provisional Patent Application No. 63/230,075 entitled BEPSPOKE OPTICAL TRANSMISSIVE STRUCTURES WITHIN INACCESSIBLE ASSEMBLIES filed Aug. 6, 2021 which is incorporated herein by reference for all purposes.

BACKGROUND

The present invention provides for cost-and-time efficient manufacture of custom optically accessible quantum-particle cells such as vapor cells, vacuum cells, and channel cells. The manufacturing process begins with a pre-customization subprocess during which a pre-customization assembly is formed at least in part by bonding two structural components of the pre-customization assembly to each other. A subsequent customization subprocess including: the formation of optically active metasurfaces, introducing quantum particles into cell interiors, and bonding of a structural component to the pre-customization assembly to seal the cell, completes manufacture of the custom quantum-particle cells. In a contemplated scenario, pre-assemblies are built in anticipation of customer orders and then stored pending these orders with product specifications. Once sufficient product specifications are received, pre-customization assemblies can be retrieved from storage and the customization subprocess executed.

DETAILED DESCRIPTION

The present invention provides for cost-and-time efficient manufacture of custom optically accessible quantum-particle cells such as vapor cells, vacuum cells, and channel cells. The manufacturing process begins with a pre-customization subprocess during which a pre-customization assembly is formed at least in part by bonding two structural components of the pre-customization assembly to each other. A subsequent customization subprocess including: the formation of optically active metasurfaces, introducing quantum particles into cell interiors, and bonding of a structural component to the pre-customization assembly to seal the cell, completes manufacture the custom quantum-particle cells. In a contemplated scenario, pre-assemblies are built in anticipation of customer orders and then stored pending these orders with product specifications. Once sufficient product specifications are received, pre-customization assemblies can be retrieved from storage and the customization subprocess executed.

The pre-customization subprocess can leverage economies of scale as a single pre-customization assembly type can be used as a starting point for end products with different specifications on the same pre-singulated assembly. During customization, pulsed lasers can be used to form optically active metasurfaces; such pulsed lasers can achieve highly localized peak temperatures so that neighboring components are not adversely affected by metasurface formation. This saves considerable time over processes that must be carefully sequenced and limited to low peak powers. Response times to customer orders are reduced due to pre-assembly and efficient customization. The associated cost savings can be passed onto customers for a commercially competitive advantage.

Figure 1:
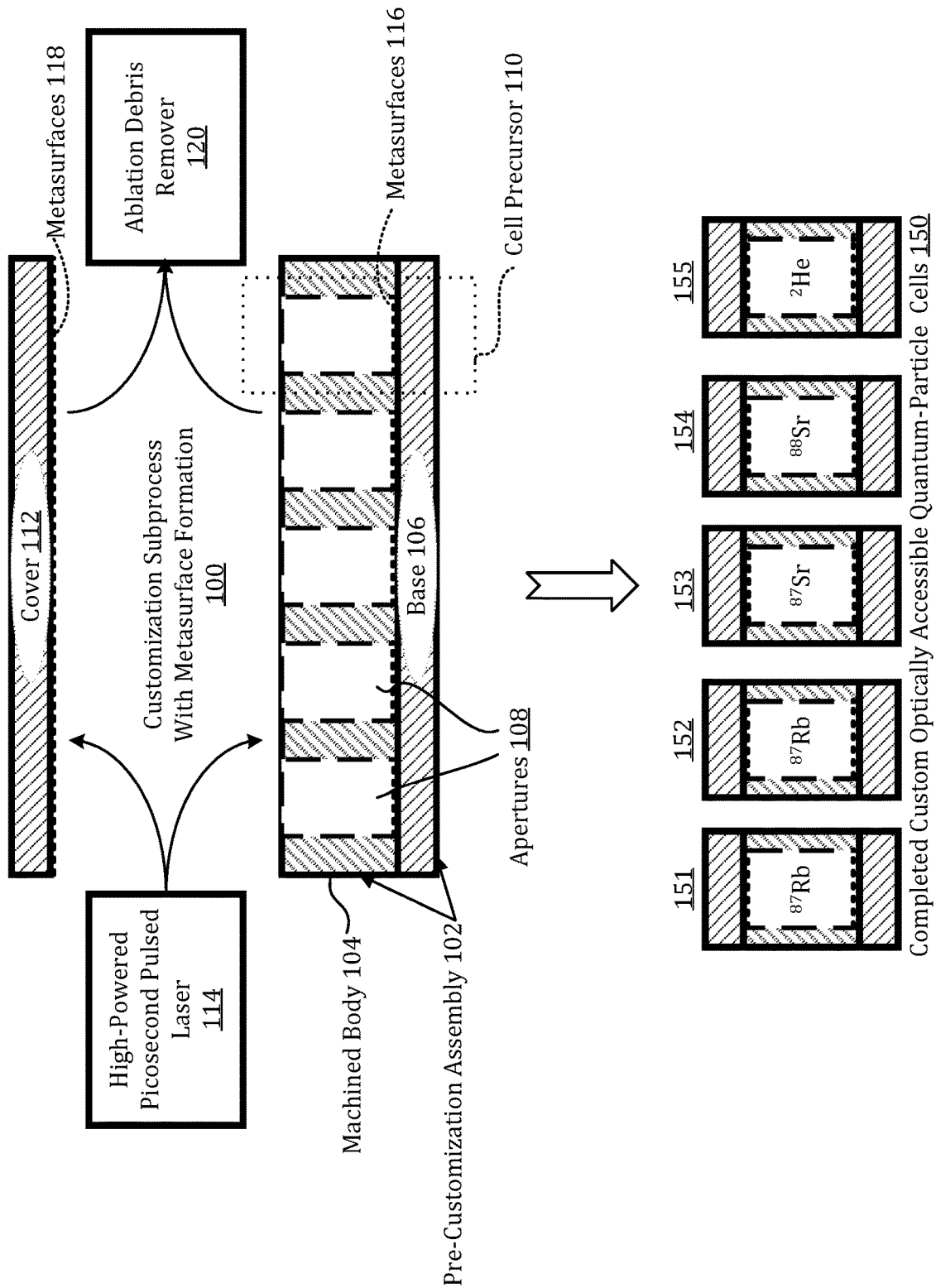
FIG. 1 is a flow diagram of a customization subprocess for manufacturing optically accessible custom quantum-particle cells.

As shown in FIG. 1, a customization subprocess 100 begins with a pre-customization assembly 102 is shown having a machined body 104 with a base 106 bonded to it. The machining involves forming apertures 108 through a block of material; these apertures are initially open at both ends. Base 106 has been anodically or otherwise direct bonded to body 104 so as to close the apertures at their bottoms to define cell interiors 108 and, thus, cell precursors 110. A cover 112 is to seal the apertures at their top ends but has not been bonded to the body as of the time represented in the upper portion of FIG. 1. Thus, the cell interiors 108 and the to-be-inwardly-facing surface of cover 112 are exposed for customization processing.

Customization subprocess 100 can include using a high-powered picosecond pulsed laser 114 to ablate material from pre-customization assembly 102 and cover 112 to form optically active metasurfaces 116 and 118. By "optically active" is meant that the metasurfaces affect incident light in some specified way; for example, the metasurfaces can render the structures on which they are formed anti-reflective (AR); in other words, the metasurfaces can serve as AR coatings for light of at least some frequency ranges. The relevant frequencies can depend on the quantum-particle types, e.g., $^{87}$Ru and/or $^{133}$Cs atoms, to be in each cell, and the applicable protocol, e.g., cooling, transporting, trapping, exciting, detection of emissions, to be implemented. Since cell interiors 108 remain open, ablated material can be removed before quantum particles are introduced and cell interiors are hermetically sealed. Customization processing can also include inserting structures, e.g., reflectors, diffractors, getters and source modules, into cell interiors.

Pre-customization assembly 100 is shown in FIG. 1 with five apertures which are to become interiors 108 for five cells. Other embodiments can have one or more assemblies with fewer or more cell precursors each. Customization can take place on two levels: inter-assembly and inter-cell. Inter-assembly customization refers to customization of identical pre-customization assemblies in different ways, e.g., for different quantum-particle types and/or different light frequencies.

Customization can also be inter-cell in that different cells within a pre-customization assembly are processed differently to provide cells that meet respectively different specifications. Thus, FIG. 1 shows completed cells 150 including cells 151 and 152 containing rubidium 87 ($^{87}$Rb), cell 153 containing strontium 87 ($^{87}$Sr), cell 154 containing strontium 88 ($^{88}$Sr), and cell 155 containing molecular helium (He$_2$). Completed cells 153, 154, and 155 conform to respectively different specifications, not only for the quantum-particle types, but also for the metasurface structures. Cells 151 and 152 meet identical specifications; in other embodiments, cells with the same quantum-particle types meet different specifications, e.g., in function (lenses vs anti-reflection) and transmission frequencies.

Figure 2:
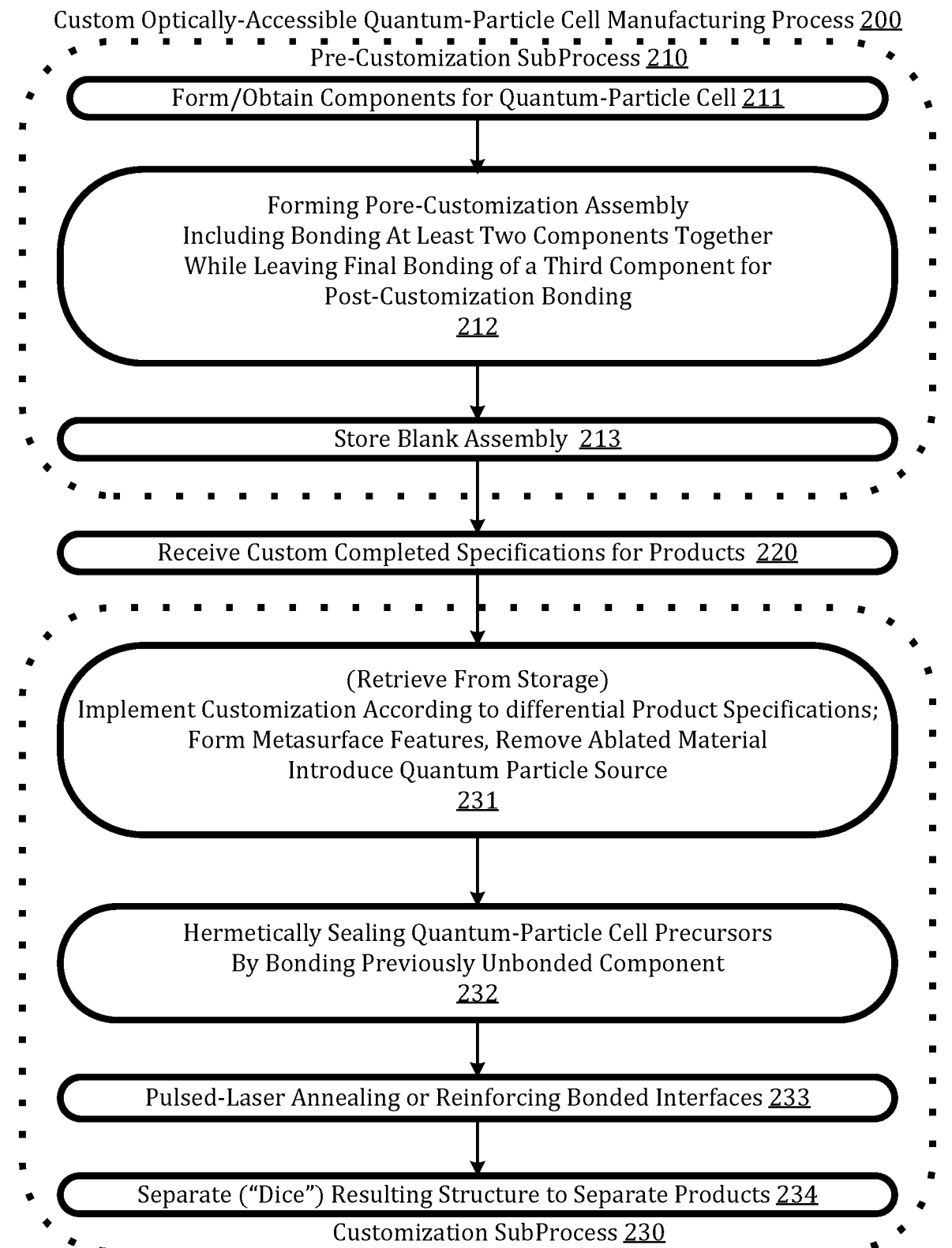
FIG. 2 is a flow chart of a process for manufacturing custom optically accessible quantum particle cells and including the subprocess of FIG. 1.

A manufacturing process 200 for custom optically accessible quantum-particle cells, flow charted in FIG. 2, includes a pre-customization subprocess 210 and a customization subprocess 230 separated by completion of receipt of specifications for custom products at 220. Pre-customization subprocess 210 begins, at 211, with forming or otherwise obtaining components for a quantum-particle cell. These components can include structural elements that can serve as interior-exterior boundary walls of the cell to be manufactured. In addition, other components can include quantum-particle sources, getter materials, mirrors, etc.

At 212, a pre-customization assembly is formed; this formation includes at least bonding one pair of structural components together. However, at least one structural component bonding is reserved for the customization subprocess so that interior cell surfaces can be physically accessed during customization. In the example of FIG. 1, a base is bonded to a machined body. In another embodiment, a base and four sides of a cell are bonded, while bonding of a cover is left for customization processing. In some embodiments, two pre-customization assemblies are formed to be bonded together during the customization process. In some embodiments, a structural component or second pre-customization assembly is temporarily attached (e.g., clamped or reversibly bonded) to a first pre-customization assembly for storage and transport. However, the attached items are subsequently separated and later bonded during customization.

At 213, the pre-assembly is transported to storage, e.g., as a part of a kit to be further assembled during customization. The pre-customization may be stored with other components temporarily attached or with protective packaging that is to be sacrificed during the customization subprocess. Storage can be in a clean room or other controlled environment to protect the preassembly and other components from contamination and deterioration. Some aspects of pre-customization processing can continue during storage, e.g., bond formation for low-temperature contact bonds. This completes the pre-customization subprocess, e.g., as represented by the upper portion of FIG. 1.

At 220, FIG. 2, after storage has begun, specifications are received for quantum-particle cells. In some scenarios, these may be a complete set of specifications, in other scenarios they may complete specifications that were received prior to storage. For example, in a scenario in which cells are manufactured in batches of 25, a final set of specifications for five cells might be received after storage begins and could trigger customization for 20 other cells whose specifications arrived earlier.

Customization subprocess 230 begins in response to the receipt of specifications at 220. At 231, customization is implemented according to product specifications including those received at 230. Typically, the pre-customization assembly and other components are retrieved from storage; in some cases, customization can take place at the storage location. Lasers are used to ablate surface material to define optically active metasurface features such as reflective, absorptive, and antireflection coatings, as well as lenses, etc. The ablation can happen prior to hermetic sealing to facilitate removal of ablated material. Quantum particles or some source of quantum particles can be introduced into cell precursors during 231. At 232, the quantum-particle cell precursors are hermetically sealed as a structural component is bonded to the pre-customization-assembly or some structure derived from the pre-customization structure. At 233, bonds can be reinforced or locally annealed such as thermally or with ultrafast laser fusion techniques reinforcing near or around the cavities to enable dicing operations which might otherwise compromise cell integrity. Such annealing or reinforcing of bonded interfaces can be performed using laser pulses of 100 picoseconds or shorter. At 234, in some scenarios, the assembled structure can be diced to yield separate quantum-particle cells.

Figure 3:
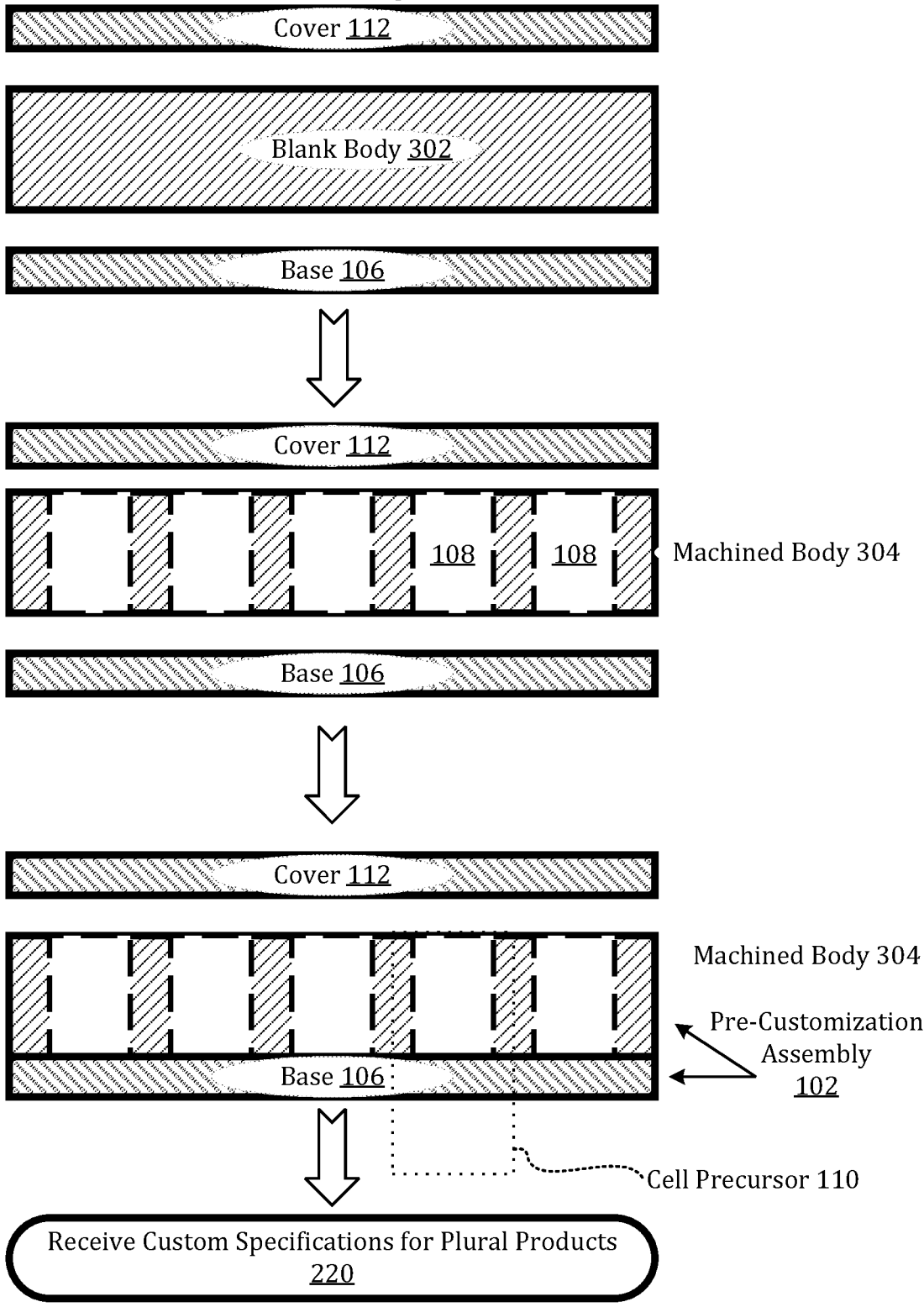
FIG. 3 is a flow diagram of a pre-customization subprocess of the process of FIG. 2 that results in a pre-customization assembly.

The formation of pre-customization assembly 102 (FIG. 1) according to pre-customization subprocess 210 (FIG. 2) is diagrammed in FIG. 3. At 211, cover 112, a blank body 302, and base 106 are obtained as indicated at the top of FIG. 3. At 212, blank body 302 is machined to form apertures 108 that are to become cell interiors. These apertures extend through machined body 302 so that apertures 108 are open at both ends. At 213, base 106 is bonded to the machined body 304 to close off the aperture bottoms to form pre-customization assembly 102, which includes five cup-like cell precursors. Pre-customization assembly 102 and cover 12 can be stored together or else can be stored separately. In some scenarios, the cover can be attached, e.g., clamped, to the pre-customization assembly to temporarily close off the cell precursors to limit contamination.

Figure 4:
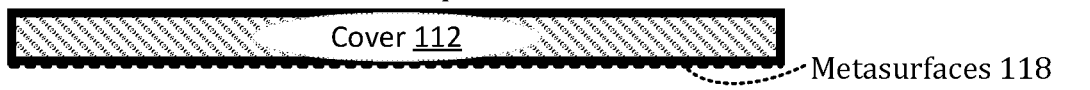
FIG. 4 is a more detailed flow diagram of the customization subprocess of FIG. 1.
Figure 4:
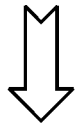
Figure 4:
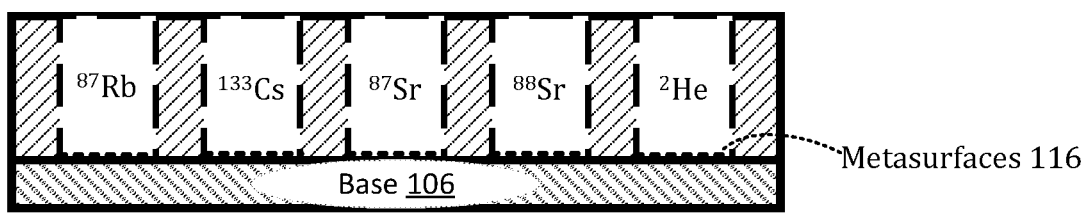
Figure 4:
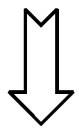
Figure 4:
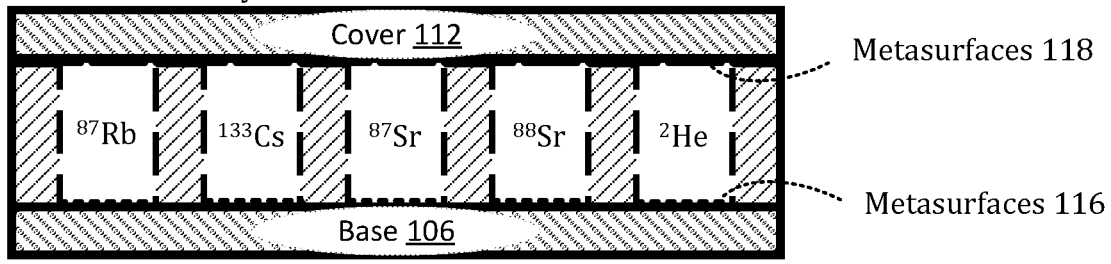
Figure 4:
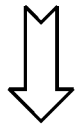
Figure 4:
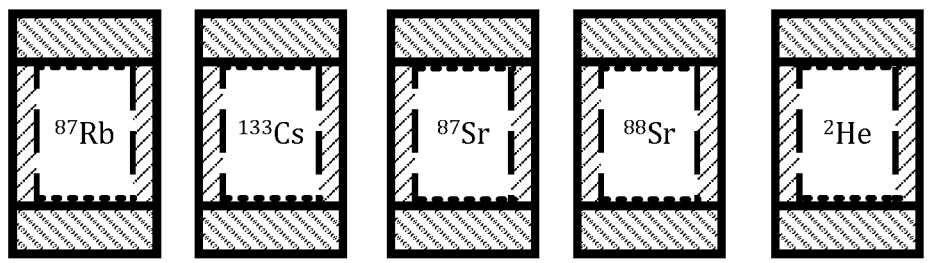

The formation of completed cells 150 (FIG. 1) according to customization subprocess 230 (FIG. 2) is diagrammed in FIG. 4. At 231, as shown at the top of FIG. 4, metasurfaces 116 and 118 can be formed and quantum-particles can be introduced into apertures 108 (FIG. 1). At 232, as shown in the middle of FIG. 4, cover 112 is bonded to pre-customization assembly 102 to hermetically seal open-topped apertures 108 in pre-customization assembly 102 to yield sealed assembly 402; the seal can be annealed and reinforced at 233. At 234, the sealed assembly 402 is diced, separating quantum-particle cells 150.

Figure 5:
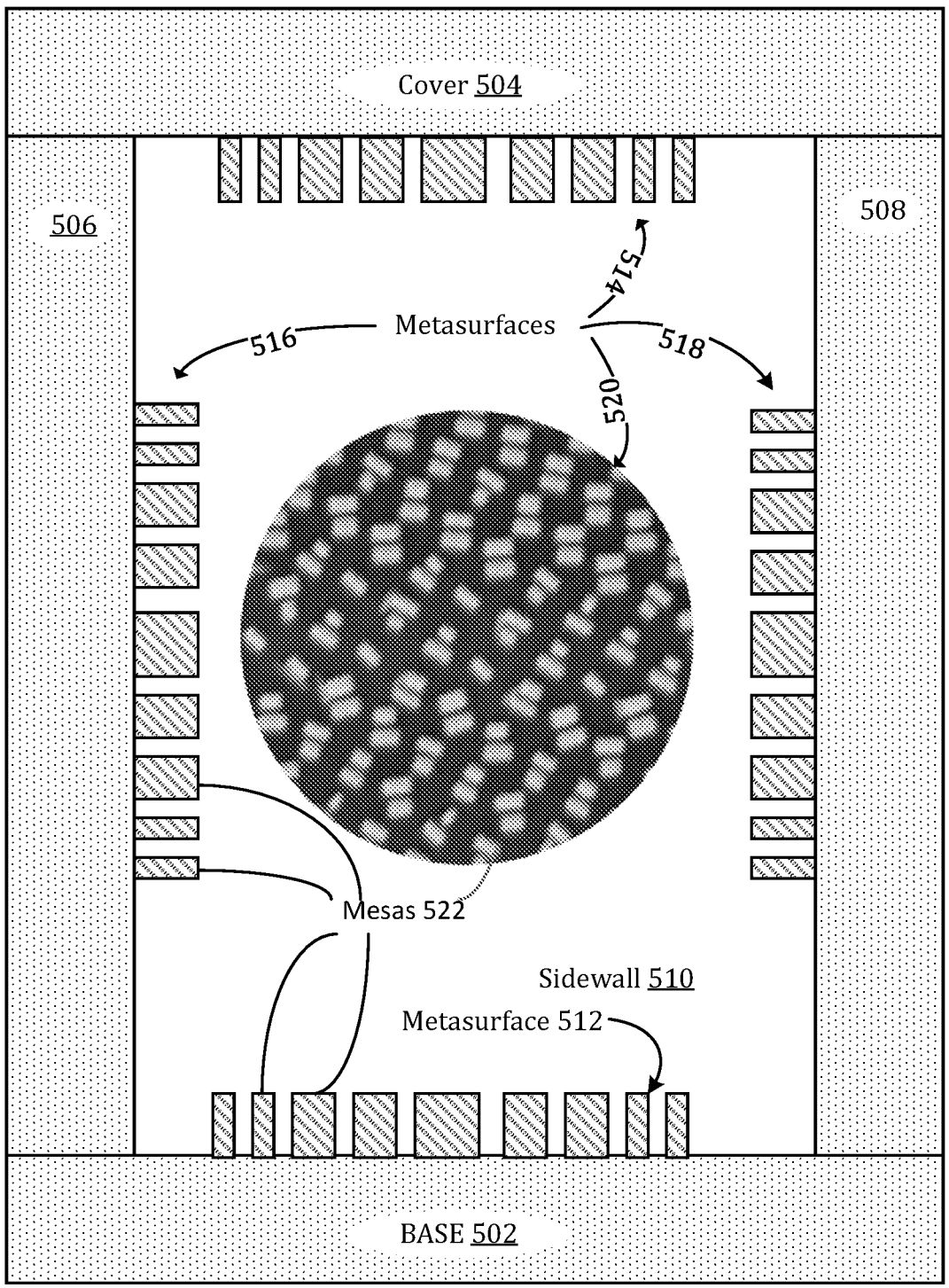
FIG. 5 is a schematic cut-away view of a custom optically accessible custom quantum particle cell resulting from the process of FIG. 2.

Each finished cell has the form of a rectangular parallelepiped so that it has six sides, five of which are shown for cell 151 in FIG. 5: a base 502, which is a section of base 106 (FIG. 2), a cover 504 which is a section of cover 112 (FIG. 2), left and right opposing walls 506 and 508, which have been formed from body 104, as were side wall 510 and its opposite wall (not shown in FIG. 5). Each of the walls 502, 504, 506, 508, and 510, has a respective metasurface structure 512, 514, 516, 518, and 520 formed on or in its interior-facing surface. Thus, base 502 has metasurface 512, cover 504 has metasurface 514, sidewalls 506, 508, and 510 respectively have metasurfaces 516, 518, and 520, while the wall that is not shown also has a metasurface formed thereon. These metasurfaces can serve different functions such as lenses, anti-reflective coatings, etc. Note that each metasurface structure is formed of same-height mesas 522 that induce interference effects in through-going light to achieve the desired optical functionality.

The image used to represent metasurface 520 was derived from FIG. 2b of Wei Ting Chen et al. "A broadband achromatic metalens for focusing and imaging in the visible", Nature Nanotechnology, Vol. 13, March 2018, pp 220-226. This article discloses a metasurface lens that achieves diffraction limited achromatic focusing from 470 nanometers (nm) to 670 nm, which is most of the visible light range. The titanium oxide (TiO2) mesas are 600 nm tall and evenly spaced at 400 nm. The cross sections are rectangular, with the smallest being 100 nm by 70 nm, and the largest being 230 nm by 170 nm. The range from 470 nm to 670 covers some of but not all the range of wavelengths of interest in ultracold-matter physics. For this reason, multiple metasurface lenses can be used collectively to accommodate ranges from violet to into the near infrared.

Figure 6:
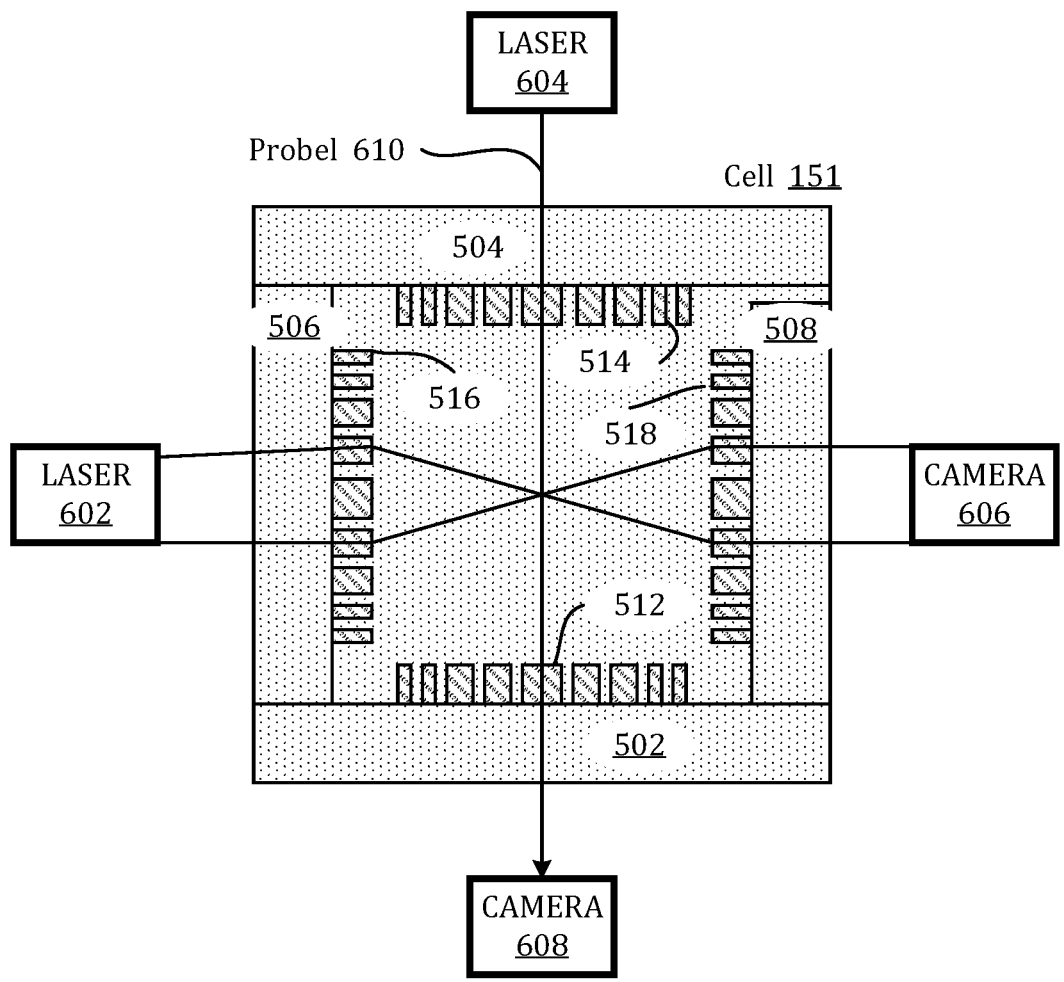
FIG. 6 is a schematic view of a quantum physics system incorporating the cell of FIG. 5.

Cell 151 is shown in FIG. 6 integrated into a quantum-particle system 600 also including lasers 602 and 604 and respective cameras 606 and 608. Alternative embodiments use photodetectors other than cameras. As shown, the output of laser 602 is focused by metasurface 516 to a center position of cell 151. The beam or emissions due to the beam diverges toward metasurface 518, which collimates the light as it travels to camera 606, which, for example, can produce images that allow fluorescence to be measured. Laser 604 outputs a probe beam 610; camera 608 captures images that allow absorption of the probe output from laser 604 due to the presence of quantum particles in cell 151 to be tracked.

Fabrication of vacuum assemblies can be expensive especially when quality optical windows are needed. Traditional methods of fabricating cells typically involve a dielectric anti-reflection or other type coating onto the glass early in the process and in batches to keep costs down. However, in such cases, all components coated at the same time must be the same type of coating. This drives costs as coatings that cover multiple wavelengths or bands become impractical as the number of targeted wavelengths increases for a single coating often necessitating multiple separate coating runs or even multiple different masked coating runs and tracking of all components through the assembly process. For assembly processes that take multiple setups and assembly steps or significant time, this becomes prohibitive.

It would be preferable to be able to apply a coating after assembly of a structure such as with chemical vapor deposition or atomic layer deposition, but these coatings are often low quality, are not robust to more extreme thermal, optical, mechanical, or chemical exposure, and it is difficult to target more than one or a couple of wavelengths of radiation transmission. Further ability to adequately mask inside an assembled vacuum chamber or assembly may be prohibitive especially through restrictive access points such as a fill tube in a vapor cell or pinch-off or vacuum port in a vacuum cell. Further, such processes often require an aperture on either end to allow vapor flow and the more restrictive the aperture the less controllable the coating. It would be preferable to be able to modify surfaces to reduce reflection both inside and outside of a partially or fully assembled vacuum enclosure/chamber with minimal concern for the size of the effective "cleanout" or access port.

Laser nanostructure patterning into surfaces can create structures that reduce back reflections by creating a gradient index structure or a grazing incidence light trap. Such nanostructures are often fabricated by chemical, plasma, or laser means. When using a laser, the material can be ablated from the surface creating cones, rods, or mounds or similar structures in a uniform or chaotic pattern as defined by the writing pattern or raster. Laser patterning can be performed through a transparent surface to the inside surface or an inside surface near the transmissive surface as long as the laser is actively "focusing" through the transmissive surface such that power densities are below ablation or damage thresholds, and then the beam(s) come to a focus or are allowed to interfere forming power densities above the critical modification, ablation, or damage threshold at the desired surface.

Further, the ablated material often levels the surface as particles that, with proper flushing, can be swept away before depositing onto adjacent or facing internal surfaces. Alternatively, a collection site may be defined by gravity, electrostatic attraction, or mechanical stiction or encapsulation such as with metal evaporators to confine and capture ablated material. Such patterns can even be formed in a sealed system with adequate particle management or indifference to particle generation. Lower laser power settings may be used to drive particles in an individual or large sweeping fashion, especially in conjunction with electrostatic attractors or fields to remove particles from surfaces of interest. Lower power settings may likewise be used to heat and "melt" "fix" or "bond" particles to desired locations.

With this technology, standardized vapor cells, channel cells, vacuum chambers and more may be pulled from a completed or nearly completed state from the storage shelf, have the final custom surface modifications applied and then be shipped to a customer. This is also a desirable method of usage because such surface structures typically cannot be handled in any fashion without permanent damage to the fragile surface coatings. Therefore, applying laser surface structure modification to a partially or fully completed assembly reduces the risk of damage to delicate coatings during the assembly process.

One workaround can be structural or chemical surface functionalization changes such as to change hydrophobicity or chemical reactivity or wettability defining a region or perimeter near or around an antireflective structure. Such a barrier or perimeter can assist repelling or channeling chemicals, reagents, adhesives, or suspended solutions used in cleaning and assembly processes to help prevent damage to regions of interest by having repulsive or moat regions separating bonding and assembly surfaces from optical, transmissive, or other functional surfaces. Such functionalized or protective engineered surfaces may also be used as traps, such as by making lower pitch features to facilitate in capture of particles generated or provide greater surface area for evaporative getters or encapsulation coatings.

Thus, the invention provides a vapor or vacuum cell, chamber, or enclosure that is partially assembled into a complex structure having at least one surface transparent to a wavelength of electro-magnetic radiation. The manufacturing process, after partial or full assembly, implementing a surface modification step such as laser nanostructure patterning into surfaces creating structures that reduce back reflections by creating a gradient index or near-to-subwavelength structure into the transparent surface, such patterning or modification being done as a custom feature to otherwise standardized subassemblies or assemblies prior to or during final assembly allows customization to otherwise standardized parts.

The resulting cell can have one or multiple transparent surfaces pre-coated with metallic, dielectric, or other thin-film coatings applied prior to laser surface modification. Subsequently, surface modification of the thin film is adjusted to achieve performance otherwise not achievable through thin film or surface structures alone. Two opposing high quality uncoated or dielectric coated windows prior or after pulling vacuum and filling with the atomic species of interest can have surface structure modifications performed to the coated and/or uncoated regions to improve optical performance in select or the entirety of regions of optically transmissive surfaces.

Surface features can be modified to form antireflective or other structures. These structures can then be coated via a line-of site or conformal dielectric, metallic, or getter coating to improve transmissive, absorptive, vacuum, pumping or mechanical performance and robustness. The cell can have one transparent and at least one internally reflective surface where the reflective surface is a high reflector made through thin film dielectric or metallic or polished native material reflectors. The cell can have at least one sidewall made of silicon or other material having thin film and/or surface structuring designed to absorb a maximum of light such as patterned black silicon.

The cell can have at least one surface, area, perimeter with chemical or mechanical surface functionalization to protect a nanostructured region from chemicals, liquids, condensation, etc., by repelling, channeling, or capturing or providing a surface to facilitate the capture of undesired material. The method of capture, encapsulation, channeling, repelling can be facilitated by optical energies, electrostatic fields (inherent or applied), thermal energies, sonic energies, or in-situ thin films such as thermally evaporated, laser sputtered etc.

The present invention also provides a process for forming custom thin-film coatings wherein a coating chamber includes controllable addressable shadow masks, barriers, deflectors, or energy deflection sources to allow multiple coating runs in a single chamber without breaking vacuum. Masks are moved to cover batch subsets temporarily to allow for different dielectric thicknesses without hurting uniformity and quality of the overall batch. While this may double the active coating time to double the types of coatings in a batch, it allows a savings on the cleaning, handling, and pump-down times.

Herein, a "system" is a group of interacting or interrelated elements that act according to a set of rules to form a unified whole. A "process" is a system in which the elements are actions. "Quantum" is an adjective characterizing a system as exhibiting or using quantum-mechanical phenomena such as eigenstates (solutions to Schrödinger's time dependent or time independent Wave Equation), superposition, and entanglement. Quantum states are eigenstates and superpositions of eigenstates. A quantum simulator is a quantum system used to emulate another quantum system. Herein, a "quantum state carrier" (QSC) is any physical system that can assume alternative eigenstates and superpositions of those eigenstates. Examples of QSCs include superconducting circuits, quantum dots in semiconductor hosts, color centers in a solid-state host (e.g., nitrogen-vacuum centers in diamond, and neutral and charged atoms and molecules.

Herein, a "quantum particle" is a "molecular entity" in the context of the study and/or use of quantum phenomena, e.g., superposition and entanglement. A "molecular entity" is "any constitutionally or isotopically distinct atom, molecule, ion, ion pair, radical, radical ion, complex, conformer, etc., identifiable as a separately distinguishable entity".

Herein, "specifications" refer to parameter values required by a customer for a product to be manufactured. A "customer" can be any person or business, including the business that does the manufacturing, that requests products to be manufactured. A "custom" product is a product manufactured according to customer specifications; "standard" is an antonym of "custom", referring to a product manufactured according to specifications not provided by a customer. Herein, a "cell" is a hermetically sealed environment. An "assembly" is a structure including components that are attached to each other but were separate before being assembled.

"Direct bonding" is a general form of bonding that may include contact, anodic, hydroxide, laser or others bonding types that do not use a frit or intermediate material. "Contact bonding" is bonding that relies on inter-component bonds, e.g., covalent Si—O bonds between a silicon component and an oxygen-bearing glass component. "Anodic bonding" is a form of contact bonding, e.g., between silicon and glass, which is accelerated by oscillating electric fields.

Herein, a "picosecond pulse" is a pulse with duration of one to 300 hundred picoseconds. A "pico-second laser" is a laser capable of outputting picosecond light pulses. A "femtosecond pulse" is a pulse of duration one to 300 hundred femtoseconds. A "femtosecond laser" is a laser capable of outputting femtosecond light pulses. Herein, "cold" means less than one millikelvin, while "ultracold" means less than one microkelvin. For example, cells in which Bose Einstein condensates are formed can include ultracold particles of temperatures below 100 nanokelvin.

Herein, a "cell boundary structure" are structures that separates the cell interior from the cell exterior once cell manufacture is complete. The disclosed machined body, cell walls, covers and bases are examples of cell boundary structures.

Herein, art labelled "prior art, if any, is admitted prior art; art not labelled "prior art", if any, is not admitted prior art. The illustrated embodiments, variations thereupon and modifications thereto are provided for by the present invention, the scope of which is defined by the accompanying claims.

What is claimed is:

1. A process comprising:
    forming a pre-customization assembly, the forming including bonding cell-boundary structures together so as to define cell-boundary walls and a cell interior;
    storing the pre-customization assembly;
    retrieving the pre-customization assembly;
    introducing quantum particles into the cell interior and forming metasurface structures by laser ablation on a cell boundary structure;
    evacuating ablation debris while the cell interior is not hermetically sealed; and
    hermetically sealing the cell interior.

2. The process of claim 1, further comprising, after the hermetically sealing, dicing the pre-customization assembly to define plural cells, each with a respective cell interior.

3. The process of claim 2, wherein the introducing of quantum particles includes introducing atoms of a first chemical element into a first cell interior of a first cell of the plural cells and introducing atoms of a second chemical element into a second cell interior of a second cell of the plural cells, the second chemical element being different from the first chemical element.

4. The process of claim 3, wherein the introducing of quantum particles includes introducing atoms of a first isotope of a first chemical element into a first cell interior of a first cell of the plural cells and introducing atoms of a second isotope of the first chemical element into a second cell interior of a second cell of the plural cells, the second isotope being different from the first isotope.

* * * * *